WILLIAM E. CARSON, OF RIVERTON, VIRGINIA.

PROCESS OF HYDRATING LIME.

1,239,256.

Specification of Letters Patent.

Patented Sept. 4, 1917.

No Drawing. Application filed December 15, 1916. Serial No. 137,214.

*To all whom it may concern:*

Be it known that I, WILLIAM E. CARSON, a citizen of the United States, residing at Riverton, in the county of Warren and State of Virginia, have invented certain new and useful Improvements in Processes of Hydrating Lime, of which the following is a specification.

This invention relates to processes of hydrating lime; and it comprises a method of producing highly plastic dry slaked lime wherein lime which may be in lump, comminuted or ground form, is slaked in two or more quantities, each with a different proportion of water, to produce two or more bodies of dry pulverulent slaked lime of different granule size, and such bodies are then mixed; and, more specifically, it comprises a method wherein powdered or granulated quicklime is rapidly mixed with water to form a slurry or paste and the mixture dumped as quickly succeeding wet layers in a tall vertical column in a container having side walls adapted to resist pressure, the speed of operation being such that each successive layer is deposited prior to occurrence of a substantial degree of chemical action between the lime and the water, and the amount of water used, while always enough to form a wet paste or slurry, being varied materially from time to time during the operation; all as more fully hereinafter set forth and as claimed.

For the purpose of this application plasticity may be defined as the power possessed by some pulverulent materials of giving with water a mass capable of shaping or molding into form; and the degree of plasticity as being the extent which such a mass will withstand admixtures of inert matter such as sand, without losing such power. In the case of lime, it is considered of high plasticity if the wet mixture of slaked lime and water spreads well under the trowel with a "buttery" consistence, and is able to take up relatively large amounts of sand without losing these characteristics.

All quicklime can be slaked in a pit or box, using plenty of water and time, to give highly plastic wet slaked lime or lime putty. Some quicklimes give better results than others, but all, with proper care, give good results. Modern conditions however demand as a commercial article a dry ready-slaked lime which on admixture with water will give at once a wet plastic material without waiting for slaking; but it has proved difficult in practice to produce such an article which is wholly satisfactory; to produce from any given lime a dry hydrate of as much plasticity as the same lime will give by wet slaking with use of as much time and care as may be needed. This difficulty in slaking, that is the time required for slaking, is responsible for unsoundness in many quick hydrated dry limes. In a good quality of slaked lime any magnesia present should also be hydrated; but it is difficult in practice to secure a substantially complete, or even a far-going, hydration of the magnesia in the quick-slaking methods in use for making dry hydrated lime.

I have found that in producing plastic materials generally it is highly desirable that there be a relatively great difference in granule size; the grain size should not be uniform. And I find that this is particularly true in the case of lime; and that much of the difficulty with the dry slaked commercial limes is due to too great uniformity in their consistence. Obviously, with ordinarily accurate work and an apparatus functioning in the proper way the material turned out is, or should be, absolutely uniform. But in this particular case, as stated, uniformity is not so desirable. The lime should all be slaked and uniformly slaked; but it should not all be slaked in the same way giving the same grain size.

The size of grain of slaked lime depends materially upon the amount of water which is present during the slaking; during the combination of water with CaO to form calcium hydrate or slaked lime. Roughly, the nearer the amount of water is to that which is required for exact slaking the finer is the grain of the resulting slaked lime; a phenomenon which is probably due to the fact that where the amount of water added to the lime is almost exactly that required for combination (including the amount vaporized if the lime is slaked hot) the action is confined to slaking alone and the quicklime, which is an indefinitely porous mass, simply breaks down into material of almost molecular fineness. On the other hand, if an excess of water is present in the liquid state it is probable that in connection with the slaking proper there is to some extent solution and redeposition of the lime which tends to make the particles grow like crystals. At all events, the same lime slaked in like manner but with different proportions of water will give products of different grain size. I have found that where such a lime is slaked in two portions, each portion having a different amount of water, in such manner as to produce two samples of dry hydrated lime of different grain size that upon mixing the two differentially slaked samples I secure a lime of a higher plasticity than that of either sample alone. Similarly, if two lots of lime of different composition, say a high magnesia lime and a high calcium lime, be slaked and the slaked limes mingled, again a composition of high plasticity results. Any variation in slaking conditions produces a different size of grain, as in beginning slaking with a limited amount of water and finishing with more water (portionwise addition of water) and I find that where a composition contains two or more differentially slaked limes of different grain size, a better plasticity is always the result.

In the present invention I utilize this fact. I may, for example, divide the lime to be slaked into two or more portions or lots and treat each portion with a different amount of water until slaking is effected and thereafter thoroughly mix the bodies of slaked lime so produced. The various lots of lime may be slaked in any of the known ways for producing dry hydrated or slaked lime.

But, as stated, it is difficult in most of the known dry slaking methods to produce thorough hydration of the magnesia. Practically all the quick methods now in use leave the magnesia unhydrated to a greater or less extent. This magnesia should be hydrated. And even with high calcium limes efficient slaking to a dry product of satisfactory properties is difficult.

In another application, Serial Number 53,049, I have disclosed and claimed a method of making dry hydrated lime wherein these difficulties in securing quick and complete hydration with the production of a satisfactory dry pulverulent lime are overcome. In said invention, I quickly mingle pulverulent or granulated quicklime with water in a pugmill or the like, effecting the mixture so quickly that no substantial hydration takes place during the mixing. The amount of water is such as to make a slurry or wet paste of the mixture. This mixture as quickly as it is formed I deposit in a tall vertical chamber with pressure resisting side walls; the deposition being in such a manner as to form a series of successive vertical layers from bottom to top. Since the slurry or paste is deposited before it has a chance to slake to any extent, it forms a sort of sealing layer for the material therebelow. The material under this wet cover begins to slake and heat, evolving steam, which steam is kept in by the wet layer which is always on top. The lime slakes in its own steam. The column of material is best formed at such a rate as to give not less than an inch in vertical height per minute, and it may advantageously be much more rapid. Stated in another way, in making a rectangular column of, say 10 by 15 feet and 30 feet high, I usually try to feed in at a rate of at least 15 tons per hour. The column of material is left for at least eight hours and advantageously it is left for two or three days. It must be kept in an absolutely quiescent state. Any agitation or stirring or drawing off during the seasoning will disturb the lime in the layers and defeat my results. I have found that with the lime slaking in its own steam under the pressure due to its weight, sufficient time being given for internal actions, it is ultimately converted into a dry pulverulent hydrated lime of great uniformity in composition. Substantially all the magnesia is, or may be, slaked, even with a high magnesia lime. The material finally removed from the tower will be found converted into a powder which is dustless in the sense that in handling and working it does not fill the air with a fine dust of caustic lime. In accomplishing these results I use a rather large amount of water, the amount of water varying from 50 to 120 pounds of water for every 100 pounds of lime, for a high calcium lime and from 40 to 90 pounds for a high magnesium lime. A high calcium lime requires, theoretically about 33 pounds per 100, so these amounts are in excess of the amount merely necessary for slaking. The excess however must be used to regulate the temperature and furnish water vapor to permeate the mass. All the excess, over that necessary for hydration, is evaporated in the process. The walls of the chamber inclosing the vertical column should be thick, in order to resist the pressure, and to keep in the heat so that all the heat of the reaction, or substantially all, is utilized, in effecting hydration and in evaporating the excess of water.

The stated process gives a highly plastic and uniform lime from almost any commercial quicklime whether the same be a high calcium lime or a high magnesium lime. Magnesia is, or may be, substantially completely slaked.

I have found however that I can still further improve the lime produced by the stated process by using in connection therewith the present invention. In so doing it is merely necessary that the amount of water used in making the stated slurry or pasty composition be varied from time to time. For example, the slurry may be made for 10 minutes with, say 100 pounds of water per 100 pounds of lime and then for 10 minutes more with, say 70 pounds of water. With the described method of operation, this results in a vertical column which may be regarded as divided into different zones; some zones having more water present than is present in other zones. Otherwise, the action is exactly that which has just been described. If after the period of aging and quiescence, the whole column of lime be drawn and used as it comes it will not vary in properties or characteristics from that produced by the ordinary practice of the stated method; and all, or substantially all, the magnesia, will be hydrated and the product in each zone will be a highly plastic, uniform, dry, dustless powder. But if all the lime in the vertical column be thoroughly admixed so as to mingle the materials of the different zones, the new product obtained will be much more plastic than any portion of the lime from any individual zone in the column taken by itself.

Instead of varying the amount of water in successive strata or zones of the lime in the ordinary column, I may of course vary the lime, using the same or different amounts of water. In every limestone deposit, different layers or strata are of somewhat different composition and these different limes slake differently; they give slaked lime of a different size of grain. Very often, there will be two distinct strata in the same formation, one being, perhaps, a high calcium lime and another, perhaps, a high magnesium lime. And even where different strata seem to have about the same composition, it is found that they will slake quite differently. Impurities in very small amount either in the lime or the water used may affect the slaking. For example, it is not only magnesia in the rock which affects the slaking of the lime but also other constituents. And I have found that I can accomplish my results in the operation of slaking in the described vertical columns in many instances by alternately supplying quicklime from different sources, or from different strata in the same bed, to the pugmill while otherwise operating as previously described.

Similar results may of course be accomplished by slaking the same grade of lime in two different vertical columns in the manner previously stated with continuous use in each column of a constant amount of water for that column, the amount however differing between the two columns. This will result in two lots of lime, each of excellent quality; but if these two lots of lime be now mixed a much better grade of lime than either is secured. The reason for this improvement is that stated ante: that the size of grain differs according to the amount of water temporarily present and by differentially slaking different portions so as to get different grain sizes and then mixing the portions so as to have a material containing both sizes of grains I get a higher plasticity.

The two columns may be made of the stated different grades or varieties of lime, such as a high calcium lime and a high-magnesium (or dolomite) lime; in which event, even with the same amount of water used in the two columns the grain sizes will be different. It is however ordinarily better to use somewhat more water with the high calcium lime than with the high magnesium lime. With these differently grained products in admixture, a lime of higher plasticity than either can be secured.

While I regard the stated column system of producing dry hydrated lime as being the best adapted for the present purposes in that it gives the highest grade of hydrate, I wish it to be understood that the present invention is also applicable to any other way of producing hydrated lime. For example, lime may be hydrated in any of the ordinary ways, as by using rotating drums, conveyers. etc., to produce a dry hydrated material and such material mixed with like material made in the same way but with different amounts of water. Or different lots of lime may be hydrated in these devices and the resulting hydrated materials mixed. But I regard the stated tower system as giving the best results because the grades of lime produced and to be mixed are in and of themselves of better quality.

Under some circumstances after the two lots of hydrated limes have been produced under such conditions that final drying is necessary, I may dry the mixture or I may dry the different lots before mingling. Grinding is not ordinarily necessary, but under some circumstances efficient results may be obtained by fine grinding a portion of the hydrated lime and mixing with the unground hydrated lime.

The point of the present invention is the production of an unusually plastic lime characterized by having particles of two different orders of fineness.

What I claim is:—

1. The process of making highly plastic, dry, hydrated lime which comprises slaking two different portions of lime in the same manner but with different proportions of water, each slaking operation being so conducted as to give a dry hydrated powder, and then mingling the two lots of powder.

2. The process of producing dry, dustless, hydrated lime of great plasticity which comprises mingling comminuted quicklime with enough water to make a slurry or paste thereof and rapidly depositing such slurry or paste as a tall vertical column inclosed by heat retaining and pressure resisting walls, the deposition to be so effected that the top of the mass is kept sealed with the slurry or paste and allowing the mass to stand for a time under its own pressure and without disturbance and mingling the lime so produced with lime made in the same manner but with a different proportion of water.

3. The process of producing hydrated lime of heightened plasticity which comprises slaking two or more lots of lime to produce uniformly slaked products of different grain size and mingling said products.

4. The process of producing dry, dustless, hydrated lime of high plasticity which comprises mingling two or more lots of lime with different proportions of water, the mingling being completed prior to occurrence of a substantial degree of slaking, slaking each such lot in a tall vertical column liquid-sealed at the top and allowed to remain quiescent for at least eight hours and mixing the resultant lots of hydrated lime.

5. The process of producing highly plastic lime which comprises slaking two lots of lime, one such lot containing more magnesia than the other such lot, and after hydration is effected mingling the resulting lots of slaked lime.

6. The process of producing dry, dustless, hydrated lime of high plasticity which comprises slaking two lots of lime, one such lot containing more magnesia than the other such lot, by mingling the comminuted lime of each such lot with sufficient water to make a slurry therewith, the mingling being effected prior to occurrence of a substantial degree of hydration and the slurry rapidly deposited in a tall, vertical column, the rapidity being such that the top layer of the column is always of wet material, allowing the columns so formed to stand and season in their own vapor without substantial disturbance for at least eight hours, removing the dry dustless powder of hydrated lime of each column and mingling the two grades of lime so produced to form lime of a higher degree of plasticity.

7. The process of producing dry, dustless, hydrated lime of high plasticity which comprises slaking two lots of lime, one such lot containing more magnesia than the other such lot, by mingling the comminuted lime of each such lot with sufficient water to make a slurry therewith, more water being used however with the lime lower in magnesia and the mingling being effected prior to occurrence of a substantial degree of hydration and the slurry being rapidly deposited in a tall vertical column, the rapidity being such that the top layer of the column is always of wet material, allowing the columns so formed to stand and season in their own vapor without substantial disturbance for at least eight hours, removing the dry, dustless powder of hydrated lime of each column and mingling the two grades of lime so produced to form lime of a higher degree of plasticity.

8. The process of producing hydrated lime of heightened plasticity which comprises slaking two or more lots of lime of different analyses to produce uniformly slaked products of different grain size and mingling said products.

9. The process of producing hydrated lime of heightened plasticity which comprises slaking two or more lots of lime, one such lot containing more magnesia than another such lot, to produce uniformly slaked products of different grain size and mingling said products.

10. The process of producing hydrated lime of heightened plasticity which comprises slaking two or more lots of lime to produce slaked products of different grain size and mingling said products.

11. In the manufacture of plastic lime, the process which comprises producing two or more lots of slaked lime of different grain size and mingling said lots.

12. The process of producing a dry highly plastic lime which comprises differentially slaking two or more portions of lime to produce a different grain size in each portion and intermingling the portions.

In testimony whereof, I affix my signature hereto.

WILLIAM E. CARSON.